(12) United States Patent
Tadano

(10) Patent No.: US 10,127,780 B2
(45) Date of Patent: Nov. 13, 2018

(54) GUIDANCE ASSISTANCE SYSTEM, GUIDANCE ASSISTANCE METHOD, AND COMPUTER-READABLE RECORDING MEDIUM

(71) Applicant: NEC Corporation, Minato-ku, Tokyo (JP)

(72) Inventor: Kumiko Tadano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/566,797

(22) PCT Filed: Apr. 19, 2016

(86) PCT No.: PCT/JP2016/002085
§ 371 (c)(1),
(2) Date: Oct. 16, 2017

(87) PCT Pub. No.: WO2016/174849
PCT Pub. Date: Nov. 3, 2016

(65) Prior Publication Data
US 2018/0096573 A1 Apr. 5, 2018

(30) Foreign Application Priority Data
Apr. 27, 2015 (JP) .................................. 2015-089997

(51) Int. Cl.
*G08B 7/06* (2006.01)
*G08B 27/00* (2006.01)

(52) U.S. Cl.
CPC ............. *G08B 7/066* (2013.01); *G08B 27/00* (2013.01)

(58) Field of Classification Search
CPC .......... G08B 7/06; G08B 7/066; G01C 21/20; G01C 21/206; G03B 21/00; H04N 9/31
(Continued)

(56) References Cited

U.S. PATENT DOCUMENTS

| | | | | |
|---|---|---|---|---|
| 2011/0157486 A1* | 6/2011 | Murata | ................. | G08B 7/062 348/744 |
| 2013/0282280 A1* | 10/2013 | Patterson | ............... | G08B 7/062 701/533 |

(Continued)

FOREIGN PATENT DOCUMENTS

| | | |
|---|---|---|
| JP | 2005-234768 A | 9/2005 |
| JP | 2007-122532 A | 5/2007 |

(Continued)

OTHER PUBLICATIONS

Tomoya Nakabe, "Route planning of crowd", Tokyo University of Technology, Faculty of Media, 3DCG component project, Graduation thesis 2004, 30 pages.

(Continued)

*Primary Examiner* — Hung T Nguyen

(57) ABSTRACT

A guidance assistance system includes an arrangement evaluation unit which derives a priority of arrangement of detection means for detecting a status of congestion on a travel route or a priority of arrangement of a guide sign for guiding the crowd based on information related to a status of the travel route and an order determination unit which determines an order of arrangement of the detection means or an order of arrangement of the guide sign based on information related to the priority.

10 Claims, 9 Drawing Sheets

(58) Field of Classification Search
USPC ...... 340/944, 286.02, 286.05, 815.4, 815.45;
348/744; 315/297; 701/533
See application file for complete search history.

(56) References Cited

U.S. PATENT DOCUMENTS

2014/0132183 A1* 5/2014 Van Herpen ........... G08B 7/066
315/297
2016/0007421 A1* 1/2016 Tey Pons ........... H05B 33/0854
315/113

FOREIGN PATENT DOCUMENTS

| JP | 2009-009233 A | 1/2009 |
| JP | 2012-083906 A | 4/2012 |
| JP | 2013-164695 A | 8/2013 |

OTHER PUBLICATIONS

International Search Report for PCT Application No. PCT/JP2016/002085, dated Jun. 14, 2016.
English translation of Written opinion for PCT Application No. PCT/JP2016/002085.

* cited by examiner

Fig.2

(A) EXAMPLE OF ROUTE

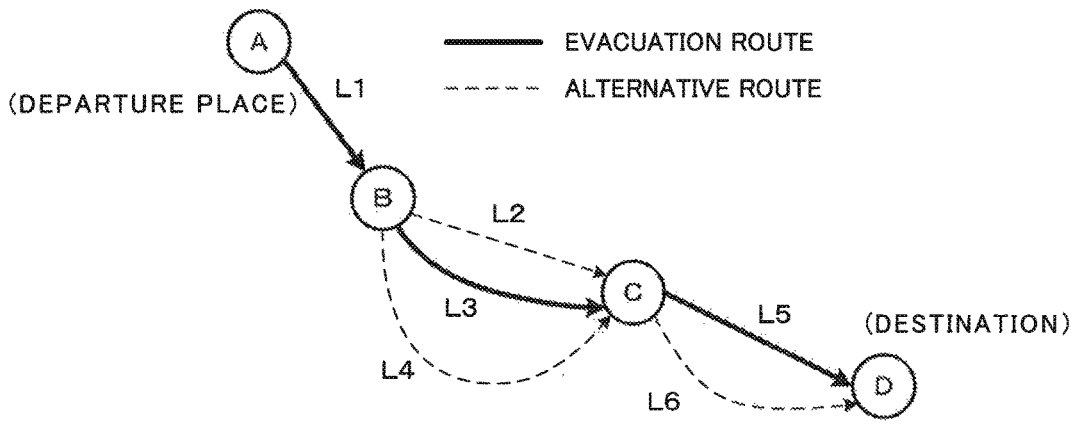

(B) EXAMPLE OF LINK INCLUDED IN ROUTE

| LINK | STARTING POINT | END POINT | CAPACITY | DISTANCE |
|---|---|---|---|---|
| L1 | A | B | 2 | 10 |
| L2 | B | C | 5 | 10 |
| L3 | B | C | 2 | 30 |
| L4 | B | C | 3 | 90 |
| L5 | C | D | 1 | 10 |
| L6 | C | D | 4 | 20 |

(C) EXAMPLE OF EVACUEE

| CROWD | DEPARTURE PLACE | DESTINATION |
|---|---|---|
| RESIDENT IN AREA A | A | D |

(D) NUMBER OF EVACUEES

| CROWD | NUMBER OF PEOPLE |
|---|---|
| RESIDENT IN AREA A | 1000 |

(E) TRAVEL ROUTE FOR EVACUEES

| CROWD | | ROUTE |
|---|---|---|
| RESIDENT IN AREA A | EVACUATION ROUTE | A→(L1)→B→(L3)→C→(L5)→D |
| | ALTERNATIVE ROUTE | A→(L1)→B→(L2,L4)→C→(L6)→D |

Fig.7

(1) RESTRICTIONS ON NUMBER OF REQUIRED GUIDE SIGNS

| AREA | NUMBER OF REQUIRED DETECTION MEANS AND GUIDE SIGNS |
|---|---|
| AREA A | 1 |

(2) ORDER OF PRIORITY RELATED TO ARRANGEMENT OF DETECTION MEANS GUIDE SIGN ON EACH LINK

| LINK | EVALUATION EXPRESSION | NECESSITY | ORDER OF PRIORITY |
|---|---|---|---|
| L3 | (1/2) | 0.5 | SECOND |
| L5 | (1/1) | 1 | FIRST |

ONE IS ARRANGED ON LINK L5 OF WHICH RANKING IS DETERMINED AS FIRST IN ORDER (3) PRESENCE OR ABSENCE OF ARRANGEMENT OF DETECTION MEANS AND GUIDE SIGN

| LINK | PRESENCE OR ABSENCE OF ARRANGEMENT |
|---|---|
| L3 | NOT ARRANGED |
| L5 | ARRANGED |

GUIDANCE ASSISTANCE SYSTEM, GUIDANCE ASSISTANCE METHOD, AND COMPUTER-READABLE RECORDING MEDIUM

This application is a National Stage Entry of PCT/JP2016/002085 filed on Apr. 19, 2016, which claims priority from Japanese Patent Application 2015-089997 filed on Apr. 27, 2015, the contents of all of which are incorporated herein by reference, in their entirety.

TECHNICAL FIELD

The present invention relates to a guidance assistance system, a guidance assistance method, and a computer-readable recording medium.

BACKGROUND ART

When a disaster occurs, there is a possibility that a victim of the disaster needs to evacuate an area in which the disaster occurred. When the victim of the disaster (hereinafter referred to as an "evacuee") who needs to evacuate evacuates, it is desirable that the evacuee evacuates via an evacuation route selected in terms of the time required for the evacuation, safety, or other reasons in advance.

On the other hand, when a large number of evacuees evacuate, there is a possibility that the evacuation route is crowded. When the evacuation route is crowded, a travelling speed at which the evacuees travel on the evacuation route may decrease. As a result, it may take a long time for the evacuees to evacuate. Further, when the evacuation route is crowded, the evacuees may be involved in a dangerous situation. Accordingly, it is necessary to suppress the congestion on the evacuation route to avoid these problems. As an example of a method for suppressing congestion of an evacuation route, it is assumed a method such that the status of the evacuees travelling on the evacuation route is detected and the evacuees are guided to another route on which there are few evacuees and congestion degree is low when a sign of congestion appears. Congestion on the evacuation route is desired to be suppressed by using a cost-effective method.

Further, even in a normal time, for example, when a large-scale event or the like is held, it may be necessary to guide the crowd participating in the event. In this case, when guiding the crowd, it is necessary to suppress the congestion on the travelling route on which the crowd is guided so as to avoid the problem caused by the congestion, similarly to the above-described case of guiding the evacuees.

PTL1 describes a technology related to an evacuation guidance system. In the evacuation guidance system described in PTL1, when drive control means provided in a security light receive an alarm signal, an evacuation center corresponding to a type of the alarm signal is specified, and controls direction display means to show a direction to the evacuation center.

In addition, PTL2 describes an evacuation guidance system which may enable reducing anxiety of evacuees relating to evacuation by specifying a route to an area for evacuation to the evacuee.

CITATION LIST

Patent Literature

[PTL 1] Japanese Patent Application Laid-Open No. 2013-164695

[PTL 2] Japanese Patent Application Laid-Open No. 2005-234768

SUMMARY OF INVENTION

Technical Problem

In the technology described in PTL1 or PLT2, it is assumed that the security light and a guide sign used for guiding the evacuees are arranged on the evacuation route in advance. However, in these technologies, the appropriateness of the location at which the security light and the guide sign are arranged is not necessarily taken into consideration. In other words, when the technology described in PTL1 or PTL2 is used, there is a possibility that the crowd including the evacuee cannot be efficiently guided The present invention has been made to solve the above-described problem, and a primary object of the present invention is to provide a guidance assistance system or the like which may enable efficient crowd guiding.

Solution to Problem

A guidance assistance system according to one aspect of the present invention includes: arrangement evaluation means for deriving a priority of arrangement of detection means for detecting a status of congestion or a guide sign for guiding a crowd based on information related to a factor having an influence on the congestion on a travel route, and order determination means for determining an order of arrangement of the detection means or the guide sign based on the priority.

A guidance assistance method according to one aspect of the present invention includes: deriving a priority of arrangement of detection means for detecting a status of congestion or a guide sign for guiding a crowd based on information related to a factor having an influence on the congestion on a travel route, and determining an order of arrangement of the detection means or the guide sign based on the priority.

A computer-readable recording medium according to one aspect of the present invention non-transitorily stores a program causing a computer to execute: a process of evaluating a priority of arrangement of detection means for detecting a status of congestion or a guide sign for guiding a crowd based on information related to a factor having an influence on the congestion on a travel route, and a process of determining an order of arrangement of the detection means or the guide sign based on the priority.

Advantageous Effects of Invention

According to the present invention, a guidance assistance system or the like, which may enable efficient crowd guiding, can be provided.

BRIEF DESCRIPTION OF DRAWINGS

FIG. 2 is a figure illustrating an example of an evacuation route or the like that is an object in a guidance assistance system according to a first example embodiment of the present invention.

FIG. 7 is a figure illustrating an example of operation of an arrangement selection unit in a guidance assistance system according to a second example embodiment of the present invention.

DESCRIPTION OF EMBODIMENTS

Figure 10:
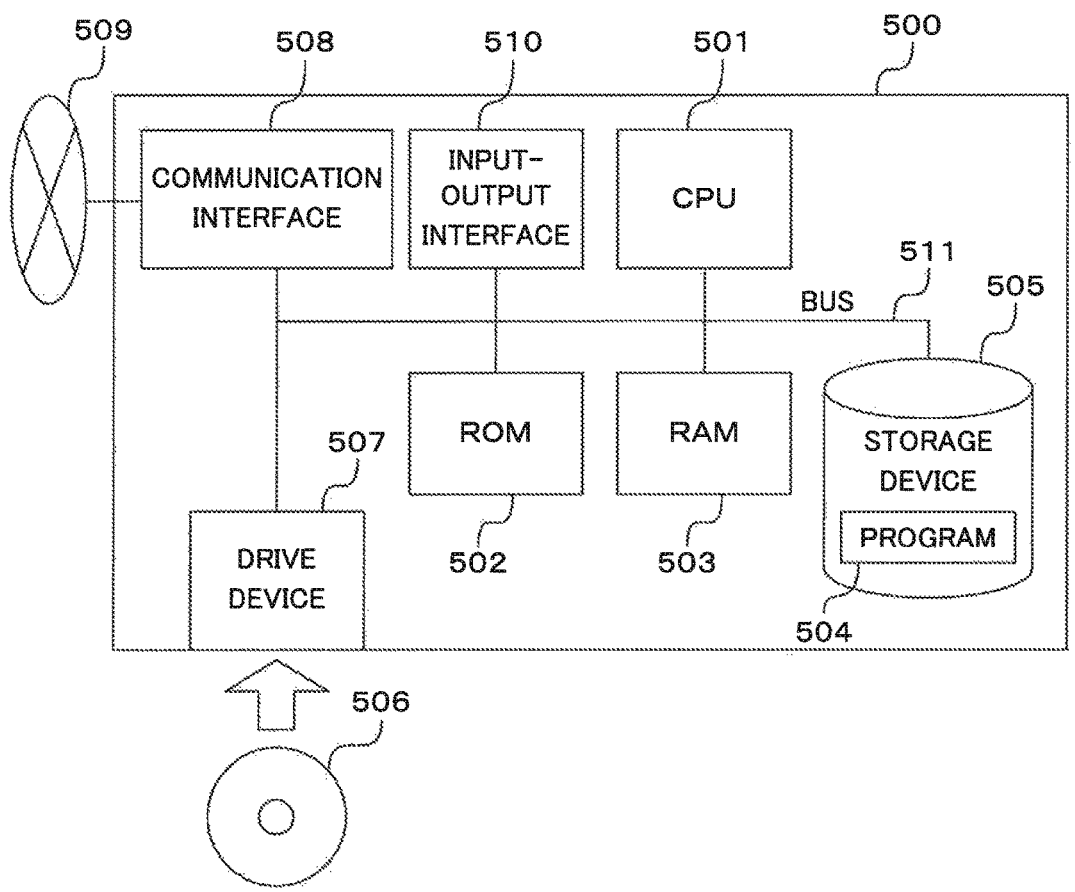
FIG. 10 is a figure illustrating an example of an information processing device which implements a guidance assistance system or the like according to each example embodiment of the present invention.

Each example embodiment of the present invention will be described with reference to an accompanying drawing. Further, in the figure illustrating each example embodiment of the present invention, each component of each device is a functional unit block. For example, each component of each device can be implemented by any suitable combination of an information processing device 500 illustrated in FIG. 10 and software. The information processing device 500 includes the following components as an example.

- a CPU (Central Processing Unit) 501
- a ROM (Read Only Memory) 502
- a RAM (Random Access Memory) 503
- a program 504 loaded in the RAM 503
- a storage device 505 that stores the program 504
- a drive device 507 which reads and writes a recording medium 506
- a communication interface 508 connected with a communication network 509
- an input-output interface 510 that inputs and outputs data
- a bus 511 that connects structural components A method for implementing each device has various modifications. For example, each device may be implemented as a dedicated device. Further, each device may be implemented by a combination of a plurality of devices. When each device is implemented by the combination of a plurality of devices, each of a plurality of the devices constituting each device may be connected to each other by a wired or wireless communication network.

Further, each system or the like according to each example embodiment of the present invention is used relating to a case in which any number of crowd travels from a departure point to a destination via a travel route that is determined in advance. In each example embodiment of the present invention, a configuration or operation of each system or the like will be described by appropriately using a case, as one example of the travel route, such that the evacuee evacuates from an evacuation origin that is the departure point, to an evacuation destination that is the destination via the evacuation route.

In a case of the evacuee evacuating via the evacuation route, it is assumed that the evacuation route is determined in advance together with a place to be the evacuation destination according to a place where the disaster occurs, a type of disaster, and other reasons by, for example, local government or other organizations relating to the evacuation route. As an example, the evacuation route is a route determined by the other organizations or other organization with taking a hazard map of an area related to the evacuation route or other information into consideration. In this case, when the region related to the evacuation route is located along mountains, a route where a landslide is expected to be less likely to occur, for example, is determined as the evacuation route. When the region related to the evacuation route is located along a coast, a route at an altitude equal to or higher than a certain height where little flood damage caused by a tsunami is expected is determined as the evacuation route. Further, the evacuation route may be the shortest route mathematically obtained by using an existing algorithm such as the Dijkstra method, or a route with less obstacles where mobility-impaired evacuees may pass.

The evacuation route, the evacuation origin that is the departure point, and the evacuation destination that is the destination may be changed depending on a status of disaster or a status of restoration at any time. Further, in each example embodiment of the present invention, a plurality of evacuation destinations may exist as the destination, and it may be assumed that the evacuees head to one of the plurality of the evacuation destinations. Further, in general case, it is assumed that the travel route, which is used when a crowd travels, is determined in advance based on various conditions such as the above-described evacuation route. Further, it may be assumed that there are a plurality of destinations and crowds head to one of the plurality of the destinations.

In each example embodiment of the present invention, detection means is any suitable means for detecting a status of congestion on the travel route such as the evacuation route. For example, a camera for photographing a status of crowd such as the evacuees on the travel route, a thermal sensor such as an infrared ray thermal sensor, a carbon dioxide concentration sensor, or other devices can be used as the detection means.

In addition, in each example embodiment of the present invention, the guide sign is any suitable means for illustrating the travel route such as the evacuation route to the crowds such as the evacuees, or the like. For example, the guide sign is an electronic signage called a digital signage which may indicate a direction, a guideboard, a guide light, or the like. Alternatively, the guide sign may be a guide person or the like who guides the evacuee at any suitable position on the evacuation route. The guide sign may be an application software that is executed on a portable electronic device such as a smartphone held by the evacuee, and guides the evacuee carrying the portable electronic device by displaying the evacuation route.

First Example Embodiment

Figure 1:
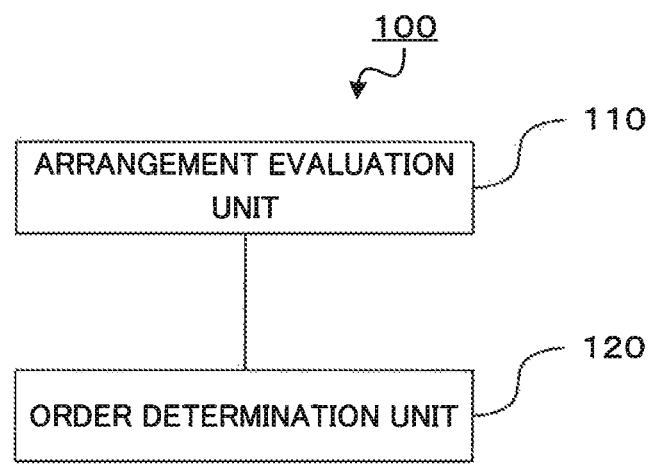
FIG. 1 is a figure illustrating a configuration of a guidance assistance system according to a first example embodiment of the present invention.
Figure 3:
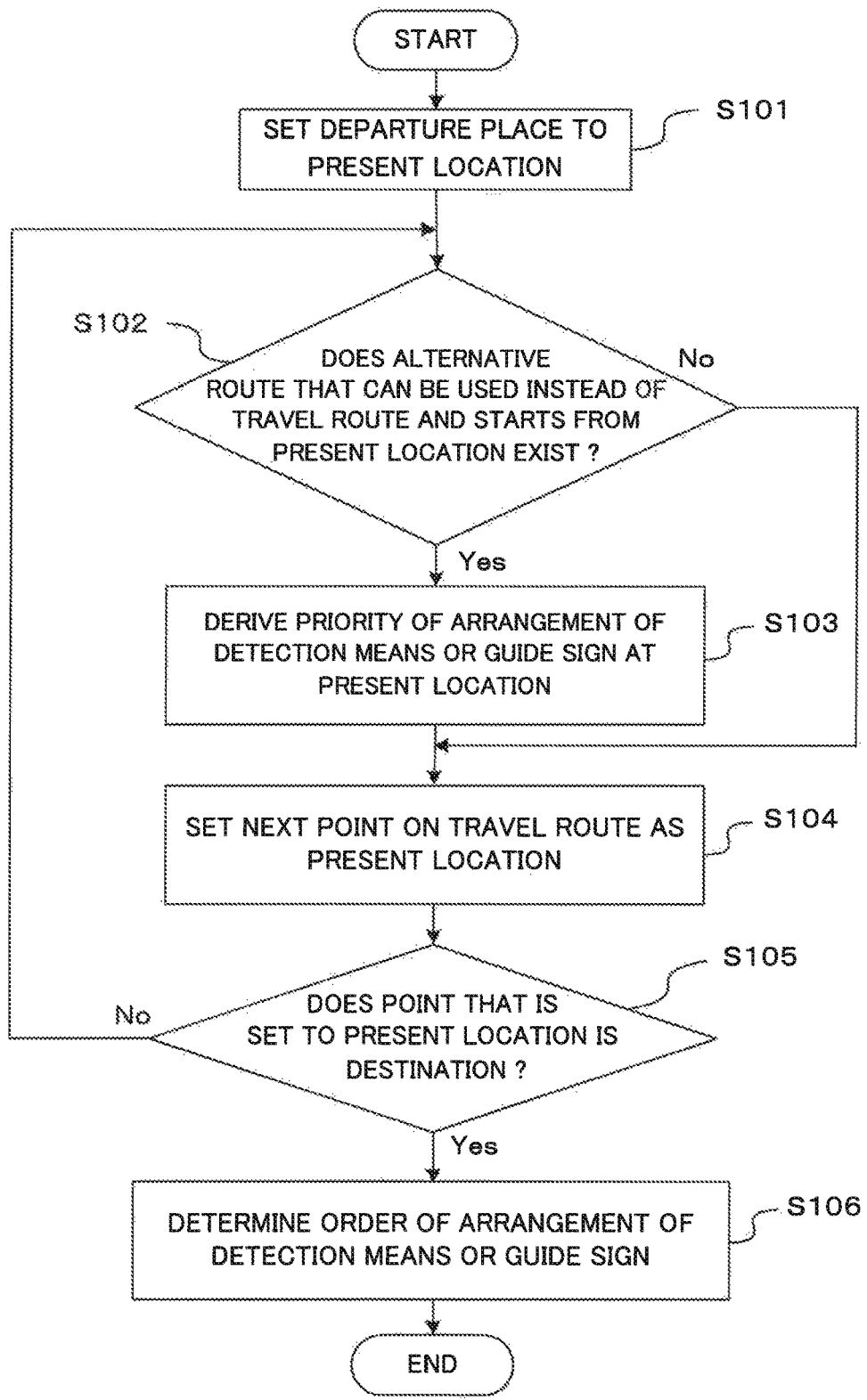
FIG. 3 is a flowchart illustrating operation of a guidance assistance system according to a first example embodiment of the present invention.
Figure 4:
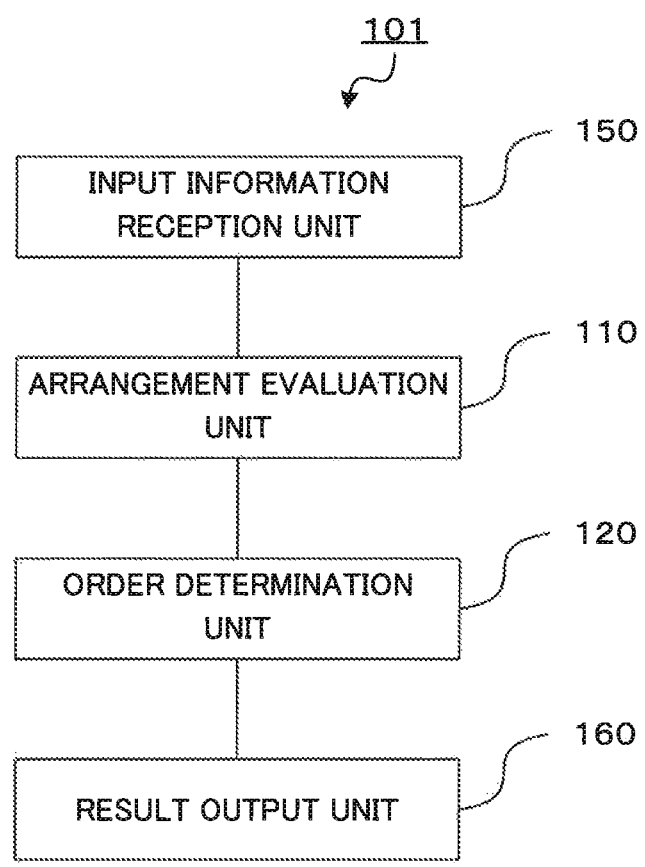
FIG. 4 is a figure illustrating a configuration of a modification example of a guidance assistance system according to a first example embodiment of the present invention.

First, a first example embodiment of the present invention will be described. FIG. 1 is a figure illustrating a configuration of a guidance assistance system according to the first example embodiment of the present invention. FIG. 2 is a figure illustrating an example of the evacuation route or the like that is an object in a guidance assistance system according to the first example embodiment of the present invention. FIG. 3 is a flowchart illustrating operation of the guidance assistance system according to the first example embodiment of the present invention. FIG. 4 is a figure illustrating a configuration of a modification example of the guidance assistance system according to the first example embodiment of the present invention.

As illustrated in FIG. 1, a guidance assistance system 100 according to the first example embodiment of the present invention includes an arrangement evaluation unit 110 and an order determination unit 120. The arrangement evaluation unit 110 derives a priority of arrangement of detection means for detecting a status of congestion on travel route or guide sign for guiding a crowd based on information related to factors having an influence on the congestion on the travel route. The order determination unit 120 determines an order of arrangement of the detection means or an order of arrangement of the guide sign based on information related to the priority. Note that, in each example embodiment of the present invention, the priority of arrangement of the detection means and the priority of arrangement of the guide sign are information respectively representing a necessity of arrangement of the detection means and a necessity of arrangement of the guide sign on the travel route, respectively. The priority is represented by a numerical value which becomes large value when indicating the necessity of arrangement of the detection means or the guide sign on the travel route is high, or any other suitable form.

As described above, the arrangement evaluation unit 110 derives the priority of arrangement of the detection means or the priority of arrangement of the guide sign on the travel route. The arrangement evaluation unit may derive both the priority of arrangement of the detection means and the priority of arrangement of the guide sign, or may derive either the priority of arrangement of the detection means or the priority of arrangement of the guide sign.

When the arrangement evaluation unit 110 derives the priority of arrangement of the detection means or the priority of arrangement of the guide sign, the travel route such as the evacuation route, on which the detection means and the guide sign are to be arranged, is represented in a form of each of FIGS. 2(A) to 2(E) as an initial condition, for example.

FIG. 2(A) is a figure illustrating an example of the route. In a case of the evacuation route for the evacuees, the route is represented by suitably-selected points relating to the evacuation route and including the departure point and the destination, and links connecting the above-described points and relating to a road or the like. The point relating to the evacuation route includes a fork where the link branches off or joins together, in addition to the departure point and the destination. Further, the link includes a link associated with a road or the like that is used for the evacuation route and a link associated with a road or the like that is assumed as to be an alternative route which substitutes the evacuation route and on which the evacuee may travel.

In an example illustrated in FIG. 2(A), as the suitably-selected point there exist a point "A" that is the departure point (evacuation origin), a point "D" that is the destination (evacuation destination), and points "B" and "C" that are forks where the link branches off or joins together. Further, there are six links L1 to L6. In an example illustrated in FIG. 2(A) and subsequent examples, the route used for the evacuation route described later is represented by a bold line, and the route used for the alternative route as described above is represented by a dotted line.

FIG. 2(B) illustrates information of the links included in the route illustrated in FIG. 2(A) described above. The information of the link illustrated in FIG. 2(B) includes information of the point that is a starting point or an end point, and information relating to a capacity of the link, a distance between the links, and the like with respect to six links L1 to L6 illustrated in FIG. 2(A). In an example illustrated in FIG. 2(B), the capacity of the link represents a traffic volume capable of passing in a certain time period on a road or the like associated with the link. In other words, the capacity of the link is determined, in general, depending on the number of lanes of the road or the like associated with the link, or the width of the road or the like. In addition, the distance between the links represents the distance from the starting point to the end point of the link. The capacity or the distance between the links are set based on information with respect to an actual road or the like associated with the link. The information of the link may include information other than the information illustrated in FIG. 2(B). Information required for deriving the priority such as the capacity or the distance, among the information of the link, may only be set to the link included in the evacuation route.

Each of FIGS. 2(C) to 2(E) illustrates information with respect to the crowd such as the evacuees among the initial conditions described above.

FIG. 2(C) illustrates information with respect to the evacuees, the evacuation origin that is the departure point of the evacuee, and the evacuation destination that is the destination. In an example illustrated in FIG. 2(C), the evacuee is a resident at the point "A" (hereinafter referred to as "residents in an area A") that is the departure point (evacuation origin). The destination (evacuation destination) of the evacuee is the point "D".

FIG. 2(D) illustrates the number of the evacuees illustrated in FIG. 2(C). In an example illustrated in FIG. 2(D), the number of residents in the area A, which are to be the evacuees, is one thousand.

FIG. 2(E) illustrates the evacuation route, on which the evacuees pass when the evacuees evacuates from the departure point (evacuation origin) to the destination (evacuation destination), and its alternative route. In an example illustrated in FIG. 2(E), it is assumed that the residents in the area A, who are the evacuees, evacuate from the point "A" that is the evacuation origin to the point "D" that is the evacuation destination via the link L1, the point "B", the link L3, the point "C", and the link L5 included in the evacuation route. Further, it is assumed that when the residents in the area A who are the evacuee evacuate along the alternative route, the evacuee evacuates from the point "A" to the point "D" via the link L1, the point "B", the link L2 or the link L4, the point "C", and the link L6.

A deviation risk evaluation unit 110 acquires the initial condition described above via any suitable input means, a communication network, or the like, for example. The deviation risk evaluation unit 110 may appropriately acquire the initial condition which is stored in advance in a memory, a disk device, or other devices.

The arrangement evaluation unit 110 derives the priority of arrangement of the detection means or the priority of arrangement of the guide sign with respect to the travel route included in the initial condition, by using the initial condition or the like described above as the information related to factors which have an influence on the congestion on the travel route.

It is conceivable that the occurrence of the congestion may be efficiently prevented by arranging the detection means or the guide sign at the place where there may be a high possibility that the congestion occurs when the evacuee evacuates. In other words, when deriving the priority described above, it is desirable that the priority is derived in such a way that the necessity of arrangement of the detection means or the guide sign for a place where there may be a high possibility of congestion is high, in order to prevent the occurrence of congestion. Further, it is desirable that the priority is derived in such a way that the necessity of arrangement of the detection means or the guide sign for a place where there may be a high possibility of congestion is high, when the crowd travels to the destination via the travel route in general.

On the other hand, with respect to roads each associated with the link for the evacuation route, there is a case in which a passable capacity in a certain time period, a road alignment or a width, a link distance, a time required for travel, or the like may differ for each roads. Similarly, with respect to actual intersection or the like associated with the forks or the like included in the evacuation route, there is a case in which the shape or the passable capacity in a certain time period may differ for each intersection. Further, due to these factors, there is a case in which a tendency of occurrence of the congestion and an influence of occurrence of the congestion may differ for each of the roads associated with a plurality of the links used for the evacuation route when the evacuee evacuates. For example, there may be many cases such that a tendency of occurrence of the congestion depends on a passable capacity of a road associated with a link in a certain time period or the presence of a slope or stairs.

Further, due to similar reasons, there is a case in which a tendency of occurrence of the congestion and an influence of occurrence of the congestion may differ for each of the roads or the like associated with a plurality of the links that are used for the travel route, when the crowd travels to the destination via the travel route in general.

The arrangement evaluation unit 110 uses information related to the capacity, the width, and the shape of the travel route described above or any suitable factor which has an influence on the ease of travel of another crowd on the travel route as the information related to the factor which has an influence on the congestion on the travel route. Namely, the arrangement evaluation unit 110 derives the priority of arrangement of the detection means or the priority of arrangement of the guide sign based on at least one item of the information by using these information as the information related to the factor which has an influence on the congestion on the travel route.

As an example, the arrangement evaluation unit 110 derives the priority of arrangement of the detection means or the priority of arrangement of the guide sign based on the capacity of the link associated with the road included in the evacuation route.

In general, a link with small capacity is highly likely to be a bottleneck when the evacuees pass, since the number of the evacuees who can pass the link in a certain time period is small. Accordingly, the arrangement evaluation unit 110 derives the priority of arrangement of the detection means or the priority of arrangement of the guide sign in such a way that there high priority is derived when a capacity of the link is small.

Specifically, the arrangement evaluation unit 110 calculates a reciprocal of the capacity for each link. The arrangement evaluation unit 110 uses the calculated reciprocal of the capacity for each of the link as the priority of arrangement of the detection means or the priority of arrangement of the guide sign for each of the link. In this case, when the value obtained as described above is large, that represents a high priority of arrangement of the detection means or the arrangement of the guide sign. In other words, when the link capacity is small, the arrangement evaluation unit 110 derives the priority in such a way that the priority of arrangement of the detection means or the priority of arrangement of the guide sign becomes high.

In an example illustrated in FIG. 2, the capacity of the link L3 is 2, and the capacity of the link L5 is 1, with respect to the evacuation route. Accordingly, the arrangement evaluation unit 110 calculates a reciprocal of the capacity of the link L3. Since the capacity of the link L3 is 2, the reciprocal of the capacity is ½. Similarly, the arrangement evaluation unit 110 calculates a reciprocal of the capacity of the link L5. Since the capacity of the link L5 is 1, the reciprocal of the capacity is 1/1 (that is, 1). The arrangement evaluation unit 110 uses the reciprocal calculated for each of the links L3 and L5 as the priority of arrangement of the detection means or the priority of arrangement of the guide sign. In other words, the arrangement evaluation unit 110 derives the priority in such a way that the link L5 with small capacity has the high priority. Note that, the symbol "/" represents division.

In an example illustrated in FIG. 2, there is no alternative route instead of the link L1 on the evacuation route. In other words, when the evacuee evacuates via the evacuation route, the evacuee cannot bypass the link L1 and use an alternative route. Accordingly, the arrangement evaluation unit 110 derives the priority of arrangement of the detection means or the priority of arrangement of the guide sign in such a way that the priority is low (this means that it is not necessary to arrange the detection means or the guide sign) compared with the link for which the alternative route is available. In this example, the arrangement evaluation unit 110 derives the priority as "0".

The arrangement evaluation unit 110 may derive the priority of arrangement of the detection means or the guide sign using another element. For example, the arrangement evaluation unit 110 may derive the priority of arrangement of the detection means or of the guide sign by using the distance between the links or any suitable attribute related to the travel of the evacuee at a point such as a link, a fork, or the like. In this case, the arrangement evaluation unit 110 may derive the above-described priority by using a combination of a plurality of suitable attributes including a reciprocal of the capacity of each link. The arrangement evaluation unit 110 may derive the priority of arrangement of the detection means or the guide sign for a point on the evacuation route different from the above-described link.

Further, as the evacuation route, a plurality of evacuation routes may be determined. Even in this case, the arrangement evaluation unit 110 may derive the priority of arrangement of the detection means or the guide sign by using the method described above.

Further, on the evacuation route, it is conceivable that there are a plurality of the evacuation destinations which are the destinations. As an example, when a disaster occurs while an event is held at a place to be the evacuation destination, a larger number of people than the number of the evacuees anticipated in an evacuation plan or the like may evacuate to the evacuation destination. In this case, in order to avoid a case such that the evacuee, the number of which exceeds the capacity of the evacuation destination, evacuates to the evacuation destination, there is a possibility that the evacuee needs to be guided to another evacuation destination. In another example, it is conceivable that a plurality of areas for evacuation are determined in advance, and the evacuee may evacuate to one of them.

Further, when a crowd travels via the travel route in general, there may be a plurality of destination of the crowds due to various circumstances.

In such a case, by arranging the detection means or the guide sign in such a way that guide to the evacuees to the destination with a small accommodatable number of people can be prevented, concentration of the evacuees to the destination with the small accommodatable number of people can be efficiently avoided. In other words, it is desirable that higher priority is derived to the destination with a small accommodatable number of people, so as to prevent the evacuees from being guided to the destination with the few accommodatable number of people.

In this case, the arrangement evaluation unit 110 may derive the priority of arrangement of the detection means or the guide sign for a case of a plurality of the evacuation destinations, which is the destination. For example, the arrangement evaluation unit 110 may derive the priority based on the number of people that can be accommodated in the destination.

More specifically, the arrangement evaluation unit 110 obtains, as the priority of arrangement of the detection means or the guide sign, a reciprocal of the number of people that can be accommodated in the destination. By deriving the above-described priority by using such method, the arrangement evaluation unit 110 can derive the priority so as to represent that the necessity of arrangement of the detection means or the guide sign is high with respect to the destination with a small accommodatable number of people.

In order to efficiently guide a crowd including evacuees or the like, it is preferable that the arrangement evaluation unit 110 derives a priority of arrangement of both the detection means and the guide sign with respect to an arrangement on the evacuation route or the like. However, it may be difficult to arrange both the detection means and the guide sign on the evacuation route, depending on a situation of a travel route such as the evacuation route or the like, or a situation of the number of the detection means or the guide signs that can be arranged on the evacuation route or the like. Accordingly, as described above, the arrangement evaluation unit 110 may derive the priority of arrangement on the evacuation route or the like for either one of the detection means or the guide signs.

Further, when the arrangement evaluation unit 110 evaluates priorities of arrangement of both the detection means and the guide sign, the arrangement evaluation unit 110 derives the priority in such a way that the priority of arrangement of both the detection means and the guide sign are approximately equal to each other. However, the arrangement evaluation unit 110 may derive the priority in such a way that the priority of arrangement of the detection means and the priority of arrangement of the guide sign are different from each other.

The order determination unit 120 determines the order of arrangement of the detection means or the guide sign based on the priority derived by the arrangement evaluation unit 110. In other words, the order determination unit 120 orders candidate locations at which the detection means or the guide sign is arranged in any suitable form based on the deviation risk derived by the deviation risk evaluation unit 110.

For example, the order determination unit 120 determines a ranking of each link on the evacuation route to which the priority is calculated in such a way that the ranking of the point with high priority is increased and sets the ranking as the order. In this case, the determined order is also considered as an order of priority indicating the necessity of arrangement of the detection means or the guide sign.

In an example illustrated in FIG. 2, the priority of the link L3 is derived as ½, and the priority of the link L5 is derived as 1, as described above. Thus, the order determination unit 120 determines the order of arrangement of the detection means or the guide sign for the link L5 as first, and determines the order of arrangement of the detection means or the guide sing for the link L3 as second, according to the value derived as the priority, for example.

In addition, in order to avoid congestion on the evacuation route, it is preferable that the detection means are arranged on a road or the like corresponding to a link to which the priority is derived, and the guide sign is arranged to an intersection or the like corresponding to a fork, that is a starting point of the link. Accordingly, the order determination unit 120 may determine the order of arrangement of the guide sign for the fork "C", that is the starting point of the link L5, as first, and the order of arrangement of the guide sign for the fork "B", that is the starting point of the link L3, as second.

The order determination unit 120 may determine the order of arrangement of the detection means or the guide sign by using a procedure different from the determination procedure described above. For example, the order determination unit 120 may determine an order of priority by ranking the priority of the arrangement of the detection means or the guide sign at each point on the evacuation route on several predetermined scales. The order determination unit 120 may determine an above-described order for limited points where the deviation risk satisfies predetermined conditions and the order of priority of arrangement of the guide sign is conceivably high, for example.

In conjunction with determining the order of arrangement of the detection means or the guide sign at each point, the order determination unit 120 may obtain information related to the arrangement of the detection means and the guide sign. For example, the order determination unit 120 may obtain information relating to a type of the guide sign arranged according to circumstances around each point or the determined order, a specific position where the guide sign is arranged on the travel route, and the like.

The determined order is outputted via, for example, output means such as a display (not illustrated) or a communication network. The deviation risk at each point or other information may be outputted, together with the order. Further, information relating to the determined order or the like may be stored in any suitable storage means (not illustrated) such as a memory or a disk device.

Next, operation of the guidance assistance system 100 according to the first example embodiment of the present invention will be described using a flowchart illustrated in FIG. 3.

First, the arrangement evaluation unit 110 derives a priority of arrangement of detection means or guide sign by processes of steps S101 to S105. First, the arrangement evaluation unit 110 sets a point to be a departure point to the present location using initial condition obtained in advance (Step S101).

Next, the arrangement evaluation unit 110 determines whether an alternative route for a travel route, the travel route including an evacuation route or the like, exists at the point set as the present location (Step S102).

When the arrangement evaluation unit 110 determines that the alternative route for the travel route exists at the point set as the present location (step S102: Yes), the process proceeds to step S103. When the arrangement evaluation unit 110 determines that the alternative route for the travel route does not exist at the point set as the present location (step S102: No), the process proceeds to step S104 without carrying out the process of step S103.

In step S103, the arrangement evaluation unit 110 derives a priority of arrangement of the detection means or the guide sign at the point set as the present location by appropriately using the initial condition obtained in advance (step S103).

Subsequent to the process of step S103, the arrangement evaluation unit 110 carries out a process of step S104. In step S104, the arrangement evaluation unit 110 sets a next point on the evacuation route as the present location. The next point on the travel route is another point that can be reached from the point as the present location via one link.

Next, the arrangement evaluation unit 110 determines whether the point set as the present location is the destination (step S105). When the point set as present location is the destination (step S105: Yes), the arrangement evaluation unit 110 proceeds to a process of step S106. When the present location is not the point set as the destination (step S105: No), the process returns to step S102, and the arrangement evaluation unit 110 determines whether the alternative route for the travel route exists at the point set as the present location.

As described above, it is assumed that a plurality of travel routes and destinations are determined. In this case, the arrangement evaluation unit 110 may repeat the processes of steps S101 to S103 appropriately, after determining that the present location is the destination at step S104.

When the process proceeds to step S106, the order determination unit 120 determines an order of arrangement of the detection means or the guide sign at each point on the travel route. The order of arrangement of the detection means or the guide sign that is determined is appropriately outputted via the output means (not illustrated) or the like.

As described above, the guidance assistance system 100 according to the first example embodiment of the present invention determines the order of arrangement of the detection means or the guide sign on the travel route for a crowd such as the evacuation route or the like based on the above-described priority of arrangement. The guidance assistance system 100 according to this exemplary embodiment is capable of determining the order of arrangement of the detection means or the guide sign at any point on the evacuation route in spite of arrangement of the detection means or the guide sign that are arranged on the evacuation route in advance. Accordingly, using the guidance assistance system 100 according to this exemplary embodiment may enable arrangement of the detection means or the guide sign at a point where congestion is highly likely to occur. Therefore, the guidance assistance system 100 according to this exemplary embodiment enables an efficient guidance for crowd including evacuees.

Modification Example of the First Example Embodiment

The guidance assistance system 100 according to the first example embodiment of the present invention has a conceivable modification examples.

As an example, a guidance assistance system 101 according to a modification example of the first example embodiment of the present invention may include an input information reception unit 150 and a result output unit 160 as illustrated in FIG. 7.

The input information reception unit 150 receives the initial condition described above, or information required for evaluating the determined arrangement of the detection means or the guide sign or the order of the arrangement. The input information reception unit 150 is implemented by any suitable output means such as a keyboard or a touch panel. The result output unit 160 outputs the order (for example, the ranking or the like) of arrangement of the detection means or the guide sign determined by the order determination unit 120. The result output unit 160 is implemented by any suitable output means such as a display. The result output unit 160 may output the priority at each point on the evacuation route derived by the arrangement evaluation unit 110 and another information.

Figure 5:
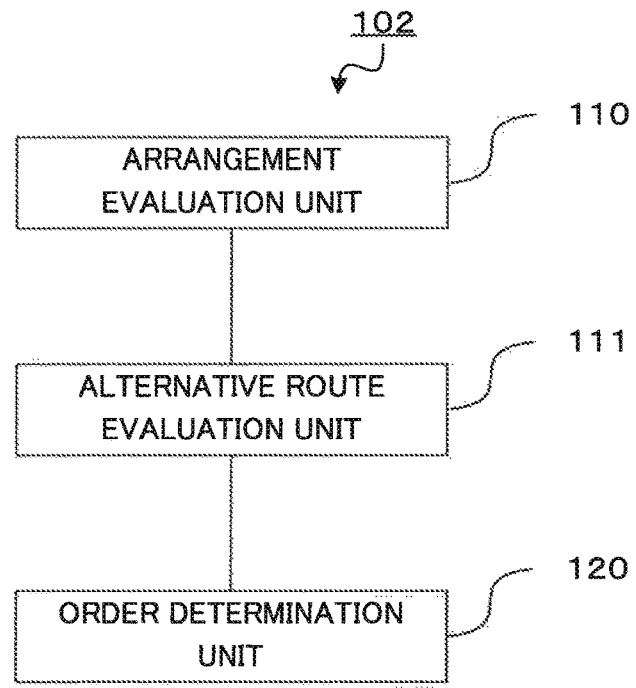
FIG. 5 is a figure illustrating a configuration of another modification example of a guidance assistance system according to a first example embodiment of the present invention.

When a plurality of alternative routes exist, the priority related to a plurality of the alternative routes may additionally be derived. In other words, a guidance assistance system 102 according to another modification example of the first example embodiment of the present invention may include an alternative route evaluation unit 111 as illustrated in FIG. 5. In this case, the priority related to the alternative route is an index representing appropriateness of whether each of the alternative routes is appropriate as the alternative route.

In the guidance assistance system 102, for example, an alternative route arrangement evaluation unit 111 derives a priority related to a plurality of the alternative routes based on capacity of each of a plurality of the alternative routes. In this case, the alternative route arrangement evaluation unit 111 may use a size of the capacity of each of a plurality of the alternative routes as the priority.

In an example of the evacuation route and the alternative route illustrated in FIG. 2, the links L2 and L4 exist as the alternative route for the link L3. The capacity of the link L2 is 5, and the capacity of the link L4 is 3. Accordingly, as the priority related to the alternative route, the arrangement evaluation unit 110 sets the priority of the link L2 to 5, and sets the priority of the link L4 to 3. In other words, the alternative route arrangement evaluation unit 111 derives the priority related to the alternative route in such a way that the high priority is set to the link L2 with large capacity among two alternative routes.

The alternative route arrangement evaluation unit 111 may derive the priority related to a plurality of alternative routes by using another index different from the link capacity described above.

The derived priority may be appropriately outputted by the output means (not illustrated) or the like. Further, an indication such that the crowd is guided to the alternative route with high priority may be made at the guide sign, to which the order of the arrangement is determined by the order determination unit 120, based on the priority derived. In the example described above, when the guide sign is arranged at the fork "B" that is the starting point of the link L3, the indication such that the crowd is guided to the link L2 may be displayed on the guide sign.

Since the priority related to a plurality of the alternative routes are calculated, the guide sign may become capable of displaying an indication or the like such that the crowd is guided to the alternative route to which high priority is derived. Accordingly, a possibility that the congestion occurs on the evacuation route can further be reduced.

In this modification example, a configuration such that the arrangement evaluation unit 110 derives the priorities related to a plurality of the alternative routes described above is conceivable.

Further, as another modification example, when deriving the priority of both the detection means and the guide sign, the arrangement evaluation unit 110 may independently derive the priority related to both of them (that is, the priority for each of them is different from each other).

When the detection means and the guide sign are arranged, it may be difficult to arrange the same number of the detection means and the guide signs due to cost limitations or other reasons. In addition, there may be a point where arrangement of the detection means such as a camera is difficult due to privacy reasons or the like on the evacuation route. Further, there may be a possibility that the congestion can be efficiently suppressed at similar cost by arranging a large number of guide signs instead of the detection means depending on a geographical factor on the evacuation route.

In this case, the arrangement evaluation unit 110 may independently derive the priority of the detection means and the priority of the guide sign by appropriately using information related to, for example, constraints on the arrangement of the detection means and the guide sign as necessary. In this manner, the detection means or the guide sign can be arranged depending on a status of the evacuation route, constraints on the number of the detection means or the guide signs, or the like. As a result, the congestion can be efficiently suppressed.

In the first example embodiment of the present invention, the guidance assistance system 100 has been described by using a case of the evacuee evacuating from the evacuation origin to the evacuation destination via the evacuation route as an example. However, as described above, the guidance assistance system 100 according to this exemplary embodiment and the modification example thereof can be applied to a case of any suitable number of crowd travelling from the departure point to the destination via the travel route determined in advance. In other words, the guidance assistance system 100 is capable of determining the order of arrangement of the detection means or the guide sign, both used for guiding the crowd, in any case when the crowd is guided via the predetermined travel route.

The configuration or the like in each modification example of the first example embodiment described above can be combined and used with each other.

Second Example Embodiment

Figure 6:
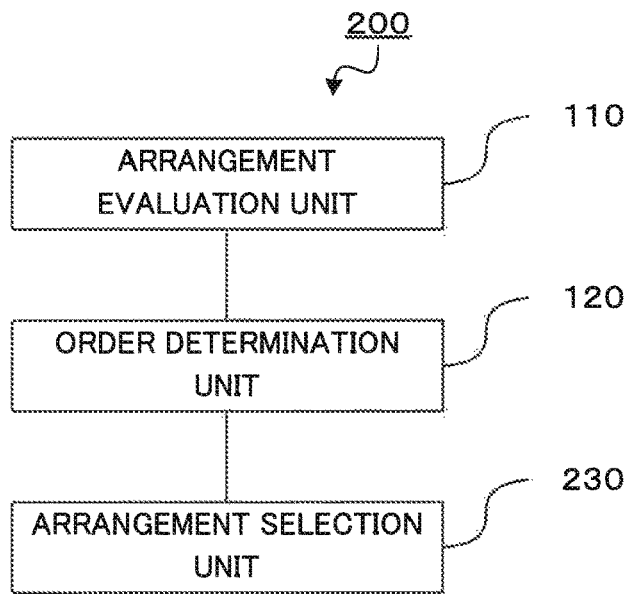
FIG. 6 is a figure illustrating a configuration of a guidance assistance system according to a second example embodiment of the present invention.
Figure 8:
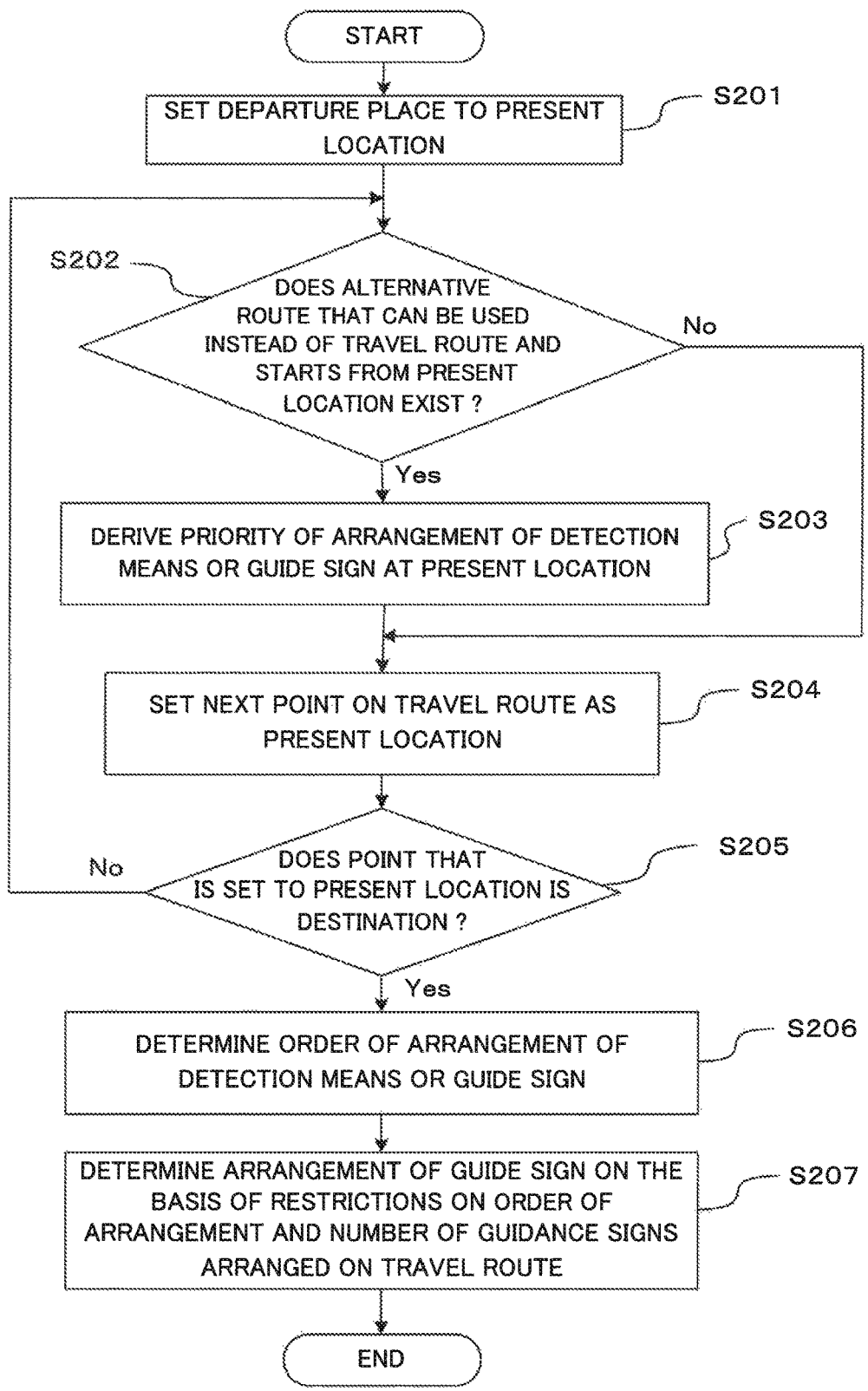
FIG. 8 is a flowchart illustrating operation of a guidance assistance system according to a second example embodiment of the present invention.
Figure 9:
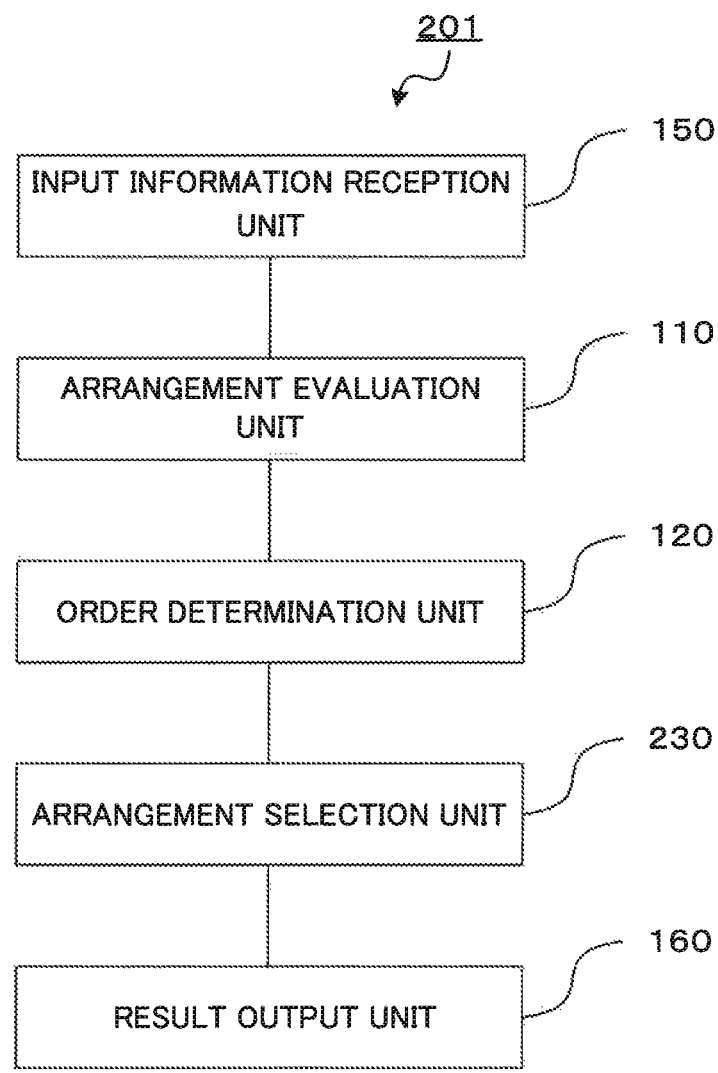
FIG. 9 is a figure illustrating a configuration of a modification example of a guidance assistance system according to a second example embodiment of the present invention.

Next, a second example embodiment of the present invention will be described. FIG. 6 is a figure illustrating a configuration of a guidance assistance system according to the second example embodiment of the present invention. FIG. 7 is a figure illustrating an example of operation of an arrangement selection unit in a guidance assistance system according to the second example embodiment of the present invention. FIG. 8 is a flowchart illustrating operation of a guidance assistance system according to the second example embodiment of the present invention. FIG. 9 is a figure illustrating a configuration of a modification example of the guidance assistance system according to the second example embodiment of the present invention.

As illustrated in FIG. 6, the guidance assistance system 200 according to the second example embodiment of the present invention includes the arrangement evaluation unit 110, the order determination unit 120, and an arrangement selection unit 230. The arrangement selection unit 230 determines arrangement of a guide sign on an evacuation route based on the order determined by the order determination unit 120 and constraints on the number of the guide signs arranged on the evacuation route. The guidance assistance system 200 according to this exemplary embodiment is different from the guidance assistance system 100 according to the first example embodiment of the present invention in the above-described point. The guidance assistance system 200 according to this exemplary embodiment may have the similar configuration as the guidance assistance system 100 according to the first example embodiment of the present invention, regarding other configurations, operation or the like.

The number of the detection means or the guide signs arranged on the evacuation route may be restricted due to constraints on such as cost or the number of persons for arranging the guide sign. The guidance assistance system 200 according to this exemplary embodiment determines the order of arrangement of the guide sign by setting the number of the detection means or the guide signs as one of constraints. In this manner, the guidance assistance system 200 according to this exemplary embodiment can efficiently guide the crowd, even when there are constraints on the number of the detection means or the guide signs.

As described above, the arrangement selection unit 230 determines the arrangement of the detection means or the guide sign on the evacuation route by using, in addition to the order, the constraints on the number of the detection means or the guide signs arranged on the evacuation route. The order is an order determined by the order determination unit 120. Further, the arrangement selection unit 230 obtains the restrictions on the number of the detection means or the guide signs arranged on the evacuation route via any suitable input means (not illustrated) or the like.

FIG. 7 is a drawing for describing an operation of the arrangement selection unit 230 determining the arrangement of the detection means or the guide sign with respect to an example illustrated in FIG. 2. The "area A" and the links L3 or L5 illustrated in FIG. 7 respectively correspond to the area A and the links L3 or L5 illustrated in FIG. 2.

In an example of FIG. 7, as illustrated in FIG. 7(1), as constraints on the number of the detection means or the guide signs, the number of the detection means and the number of the guide signs are constrained to one. In addition, as illustrated in FIG. 7(2), an evaluation expression for calculating the priority and a value derived as the priority are obtained, with respect to the links L3 and L5 existing on the evacuation route with the alternative route. In this case, the arrangement selection unit 230 determines the arrangement of the guide sign in such a way that the guide sign is arranged at a point with high priority. In particular, the arrangement selection unit 230 selects the arrangement in such a way that the detection means and the guide sign are arranged on the link L5, the ranking of which is the first in the order. In this case, the arrangement selection unit 230 may select the arrangement in such a way that the detection means is arranged at the fork "C", which is the starting point of the link L5.

The number with respect to the detection means or the guide signs and set as the constraint to the arrangement selection unit 230 may be equal or different from each other.

The arrangement selection unit 230 may determine the arrangement of the detection means or the arrangement of the guide sign in a different way from the above-described method. For example, the arrangement selection unit 230 may determine the arrangement of the detection means or the arrangement of the guide sign based on the constraints on the number determined for each kind of the detection means or the guide signs. When determining the arrangement based on such constraints, the arrangement selection unit 230 can determine the arrangement of the guide sign, for example, in such a way that the detection means with high detection accuracy or the guide sign with high effect is arranged at the point with high priority.

Further, when a plurality of destinations are determined, the arrangement selection unit 230 may determine the arrangement of the detection means and the guide sign so that the evacuee is guided to the specific destination among a plurality of destinations.

Next, the operation of the guidance assistance system 200 according to the second example embodiment of the present invention will be described by using a flowchart illustrated in FIG. 8.

First, the arrangement evaluation unit 110 sets a point to be a departure point on the travel route including the evacuation route or the like to the present location (step S201). Next, the arrangement evaluation unit 110 determines whether an alternative route for the travel route from the point set as the present location exists (step S202).

When the arrangement evaluation unit 110 determines that the alternative route for the travel route exists at the point set as the present location (step S202: Yes), the process proceeds to step S203. When the arrangement evaluation unit 110 determines that the alternative route for the travel route does not exist at the point set as the present location (step S202: No), the process proceeds to step S204 without the process of step S203.

In step S203, the arrangement evaluation unit 110 derives the priority of arrangement of the detection means or the guide sign at the point set as the present location by appropriately using the initial condition obtained in advance. Further, in step S204, the arrangement evaluation unit 110 sets a next point on the travel route as the present location. Next, the deviation risk evaluation unit 110 determines whether the point set as the present location is the destination (step S205). When the point set as the present location is not the destination (step S205: No), the arrangement evaluation unit 110 returns to step S202, and repeats the process. When the point set as the present location is determined to be the destination (step S205: Yes), the arrangement selection unit 120 determines the order of arrangement of the detection means or the order of arrangement of the guidance, based on the priority described above (step S206).

In each step of steps S201 to S206, the guidance assistance system 200 performs the processes similarly to the processes of steps S101 to S105 performed by the guidance assistance system 100 according to the first example embodiment of the present invention.

Next, the arrangement selection unit 230 of the guidance assistance system 200 determines the arrangement of the guide sign on the travel route, based on the order and the constraints on the number of the guide signs arranged on the travel route (step S207). In other words, the arrangement selection unit 230 selects the required number of the detection means or position where the of the guide signs are arranged, based on the order or the like obtained in step S205 or the constraints on the number of the detection means or the number of the guide signs obtained in advance.

As described above, the guidance assistance system 200 according to the second example embodiment of the present invention further includes the arrangement selection unit 230. The arrangement selection unit 230 determines the arrangement of the guide sign on the travel route including the evacuation route, based on the priority of arrangement of the detection means or the guide signs and the constraints on the number of the detection means or the guide signs arranged on the travel route. Accordingly, the guidance assistance system 200 according to this exemplary embodiment can efficiently guide the crowd when the number of the detection means or the number of the guide signs are constrained.

Modification Example of the Second Example Embodiment

The guidance assistance system 200 according to the second example embodiment of the present invention has a conceivable modification examples, as the guidance assistance system 100 according to the first example embodiment of the present invention.

As an example, a guidance assistance system 201 according to the second example embodiment of the present invention may include an input information reception unit 150 and a result output unit 160, as illustrated in FIG. 9. The input information reception unit 150 and the result output unit 160 included in the guidance assistance system 201 have the similar configuration as the input information reception unit 150 and the result output unit 160 included in the guidance assistance system 101 according to the modification example of the first example embodiment of the present invention, respectively.

Further, the configuration or operation of another modification example of the guidance assistance system 100 according to the first example embodiment of the present invention can be used by appropriately combining with the guidance assistance system 200 according to this exemplary embodiment.

In the second example embodiment of the present invention, the guidance assistance system 200 has been described by using a case of evacuee evacuating from the evacuation origin to the evacuation destination via the evacuation route as an example. However, as described above, the guidance assistance system 200 according to this exemplary embodiment and the modification example thereof can be applied when any number of crowd travel from the departure point to the destination via the travel route determined in advance.

While the present invention has been described above with reference to the example embodiment, the present invention is not limited to the above mentioned example embodiments. Various changes in the configuration or details of the present invention that can be understood by those skilled in the art can be made without departing from the scope of the present invention. Further, the configuration of each example embodiment can be combined with each other without departing from the scope of the present invention.

This application claims priority from Japanese Patent Application No. 2015-089997 filed on Apr. 27, 2015, the disclosure of which is incorporated herein by reference in its entirety.

REFERENCE SIGNS LIST 100 guidance assistance system
110 arrangement evaluation unit
111 alternative route evaluation unit
120 order determination unit
230 arrangement selection unit
150 input information reception unit
160 result output unit
500 information processing device
501 CPU
502 ROM
503 RAM 504 program
505 storage device
506 recording medium
507 drive device
508 communication interface
509 communication network
510 input-output interface
511 bus

What is claimed is:

1. A guidance assistance system comprising:
at least one processing component configured to:
derive a priority of arrangement of a detector for detecting a status of congestion or a guide sign for guiding a crowd based on information related to a factor having an influence on the congestion on a travel route; and
determine an order of arrangement of the detector or the guide sign based on the priority, wherein
the at least one processing component is further configured to:
derive the priority in such a way that the priority related to the travel route for which an alternative route is available is high compared with the priority related to the travel route for which no alternative route is available.

2. The guidance assistance system according to claim 1, wherein
the at least one processing component is further configured to:
derive the priority based on a capacity representing a traffic volume capable of passing in a certain time period.

3. The guidance assistance system according to claim 2, wherein
the at least one processing component is further configured to:
derive the priority according to a reciprocal of a value representing the capacity.

4. The guidance assistance system according to claim 1, wherein
the at least one processing component is further configured to:
derive the priority based on a number of people accommodated in a destination when the crowd travels.

5. The guidance assistance system according to claim 4, wherein
the at least one processing component is further configured to:
derive the priority according to a value of the reciprocal of the number of people accommodated in a destination when the crowd travels.

6. The guidance assistance system according to claim 1, wherein
the at least one processing component is further configured to:
derive the priority related to an alternative route when there are a plurality of the alternative routes to the travel route.

7. The guidance assistance system according to claim 1, wherein
the at least one processing component is further configured to:
determine the arrangement of the guide sign on the travel route based on constraints on the order and a number of the detector or the guide signs arranged on the travel route.

8. The guidance assistance system described in claim 1, wherein
the crowd is at least one evacuee, and the travel route is an evacuation route of the evacuees.

9. A guidance assistance method comprising:
deriving a priority of arrangement of a detector for detecting a status of congestion or a guide sign for guiding a crowd based on information related to a factor having an influence on the congestion on a travel route; and
determining an order of arrangement of the detector or the guide sign based on the priority,
deriving the priority in such a way that the priority related to the travel route for which an alternative route is available is high compared with the priority related to the travel route for which no alternative route is available.

10. A non-transitory computer-readable recording medium storing a program causing a computer to execute:
a process of evaluating a priority of arrangement of a detector for detecting a status of congestion or a guide sign for guiding a crowd based on information related to a factor having an influence on the congestion on a travel route; and
a process of determining an order of arrangement of the detector or the guide sign based on the priority,
a process of deriving the priority in such a way that the priority related to the travel route for which an alternative route is available is high compared with the priority related to the travel route for which no alternative route is available.

* * * * *